United States Patent [19]
Kwiatkowski

[11] Patent Number: 5,690,081
[45] Date of Patent: Nov. 25, 1997

[54] CYLINDER HEAD FOR A LIQUID-COOLED MULTI-CYLINDER INTERNAL COMBUSTION ENGINE

[75] Inventor: Janusz Kwiatkowski, Stuttgart, Germany

[73] Assignee: Mercedes-Benz AG, Stuttgart, Germany

[21] Appl. No.: 685,942

[22] Filed: Jul. 22, 1996

[30] Foreign Application Priority Data

Aug. 30, 1995 [DE] Germany ............... 195 31 875.7

[51] Int. Cl.⁶ ............................................. F02M 25/07
[52] U.S. Cl. ............................................. 123/570
[58] Field of Search ....................... 123/568, 569, 123/570, 571, 41.82 R, 193.5

[56] References Cited

U.S. PATENT DOCUMENTS

| | | | |
|---|---|---|---|
| 3,937,194 | 2/1976 | Tamaki et al. | 123/568 |
| 4,271,810 | 6/1981 | Lancaster | 123/568 |
| 4,328,781 | 5/1982 | Morita | 123/570 |
| 4,422,430 | 12/1983 | Wiatrak | 123/568 |
| 4,643,157 | 2/1987 | Nishikawa et al. | 123/570 |
| 4,854,291 | 8/1989 | Elsbett et al. | 123/569 |
| 5,203,310 | 4/1993 | Gatellier | 123/568 |
| 5,351,668 | 10/1994 | Gatellier | 123/568 |

FOREIGN PATENT DOCUMENTS

| | | |
|---|---|---|
| 30 25 106 | 8/1986 | Germany . |
| 43 44 356 | 7/1994 | Germany . |
| 44 10 686 | 10/1994 | Germany . |

*Primary Examiner*—Willis R. Wolfe
*Attorney, Agent, or Firm*—Klaus J. Bach

[57] ABSTRACT

In a cylinder head for a liquid cooled internal combustion engine with a casing with a coolant space and with air inlet and exhaust gas outlet passages and inlet and exhaust valves in the inlet and exhaust passages, an integrated channel system is provided which includes at least a first channel with connecting branches to the outlet passages and a second channel with connecting branches to the inlet passages for selectively supplying secondary air to the outlet passages or exhaust gas to the inlet passages of the cylinder head.

9 Claims, 2 Drawing Sheets

5,690,081

CYLINDER HEAD FOR A LIQUID-COOLED MULTI-CYLINDER INTERNAL COMBUSTION ENGINE

BACKGROUND OF THE INVENTION

The invention relates to a cylinder head for a liquid cooled multi-cylinder internal combustion engine with a cylinder head including coolant spaces and intake and exhaust gas passages controlled by intake and exhaust valves.

DE 30 25 106 discloses a cylinder head for an internal combustion engine with an intake system wherein an exhaust gas recirculation pipe branching off the exhaust pipe supplies exhaust gas to the intake pipe by way of a pipe system which includes an exhaust gas recirculation control valve. The cylinder head includes a passage leading to the intake passage adjacent the intake valve through which exhaust gas can be recirculated to the engine cylinder in order to realize the known advantages of exhaust gas recirculation for improved combustion of a lean gas mixture.

DE OS 44 10 686 also discloses an air intake system for an internal combustion engine wherein vent gases from the crank case as well as exhaust gases are supplied at least to one intake air passage.

However, both air intake systems mentioned above have the disadvantage that a complicated exhaust gas channeling system is required for the recirculation of the exhaust gas which, furthermore, requires a relatively large amount of engine compartment space. In addition, these channeling systems have the disadvantage that the exhaust gas suffers a temperature loss when passing through the external recirculation pipes and this is disadvantageous particularly for the mixture formation since high temperatures of the recirculated exhaust gases improve the mixture formation and, consequently, the combustion of the mixture. Furthermore, the external exhaust gas recirculation lines tend to form condensation at their inner surfaces which inhibits gas flow through the exhaust gas recirculation lines and which may even lead to damages in the exhaust gas recirculation lines when the condensate freezes in the exhaust gas recirculation line in winter.

It is also known to be advantageous if the engine includes a secondary air admission system by which air is admixed to the exhaust gases since the secondary air causes a subsequent reaction of unburned HC or CO components with the available air oxygen whereby the exhaust gas quality is improved. This is particularly true for the warm-up period of gasoline engines which must be operated during warm up with an excessively rich mixture because part of the gasoline is condensed on the cold engine walls.

DE OS 43 44 356 discloses a cylinder head of an internal combustion engine with secondary air admission wherein secondary air channels are formed in the cylinder head by recesses adjacent sealing surfaces which are covered when the engine is assembled. The secondary air channels so formed include bores which lead to the engine exhaust channel in such a way that the exhaust gas generates a suction effect by which secondary air is pulled into the exhaust channel.

This arrangement however, may detrimentally affect the seals or gaskets or the gaskets must be a special type capable of withstanding the given conditions.

It is the object of the present invention to provide a cylinder head for a liquid cooled multi-cylinder internal combustion engine with inlet and outlet channels and intake and exhaust valves wherein exhaust gas recirculation and secondary air admission can be accommodated within the cylinder head in a simple manner.

SUMMARY OF THE INVENTION

In a cylinder head for a liquid cooled internal combustion engine with a casing with a coolant space and with air inlet and exhaust gas outlet passages and inlet and exhaust valves in the inlet and exhaust passages, an integrated channel system is provided which includes at least a first channel with connecting branches to the outlet passages and a second channel with connecting branches to the inlet passages for selectively supplying secondary air to the outlet passages or exhaust gas to the inlet passages of the cylinder head.

With the integrated cylinder head channel system according to the invention the exhaust gas recirculation system as well as the secondary air admission system can be provided in the cylinder head in a compact arrangement. With this arrangement, expensive and bothersome external exhaust gas recirculation lines can be eliminated whereby costs are reduced and, in addition, because of the sensitivity of the normal exhaust gas recirculation systems, the engine reliability is improved. This is particularly true for exhaust gas recirculation systems which use plastic induction pipes in order to save weight. The damage occurring to plastic induction pipes as a result of the high exhaust gas temperatures will not occur with the arrangement according to the invention. Since the channel system for the secondary air admission and for the exhaust gas recirculation is integrated into the cylinder head, the flow passages are very short. As a result, the recirculated exhaust gas is admitted to the intake ducts with only little temperature loss whereby better combustion of the air/gas mixture is achieved. In addition, changes in the exhaust gas recirculation rates on the basis of different operating conditions in the respective cylinders can be instantly determined and the flow can be instantly adjusted for more efficient engine operation.

The channel system integrated into the cylinder head has further the advantage that the connections between the integrated channel system and the gas change ducts (intake and exhaust passages) are arranged very close to the respective valves so that, under the respective operating condition, the secondary air and also the recirculated exhaust gas are admitted in a highly efficient manner.

By the integration of channel system into the cylinder head, it is further possible to avoid the condensation problems which are encountered by the state-of-the-art exhaust gas recirculation systems since during engine operation the temperatures in the cylinder head and, consequently, in the integrated channel systems are high enough to prevent condensation and the collection of condensate.

In a preferred embodiment, the various channels of the integrated channel system are interconnected by means of a flange structure mounted on the cylinder head providing for a highly compact arrangement. The exhaust gas recirculation valve and the conduits for the secondary air admission may be incorporated in this flange structure. In this manner, the two channel portions of the integrated channel system can be easily placed into communication with one another by control of the exhaust gas recirculation valve.

The invention will become more readily apparent from the following description of preferred embodiments thereof on the basis of the accompanying drawings.

DESCRIPTION OF PREFERRED EMBODIMENTS

Figure 1:
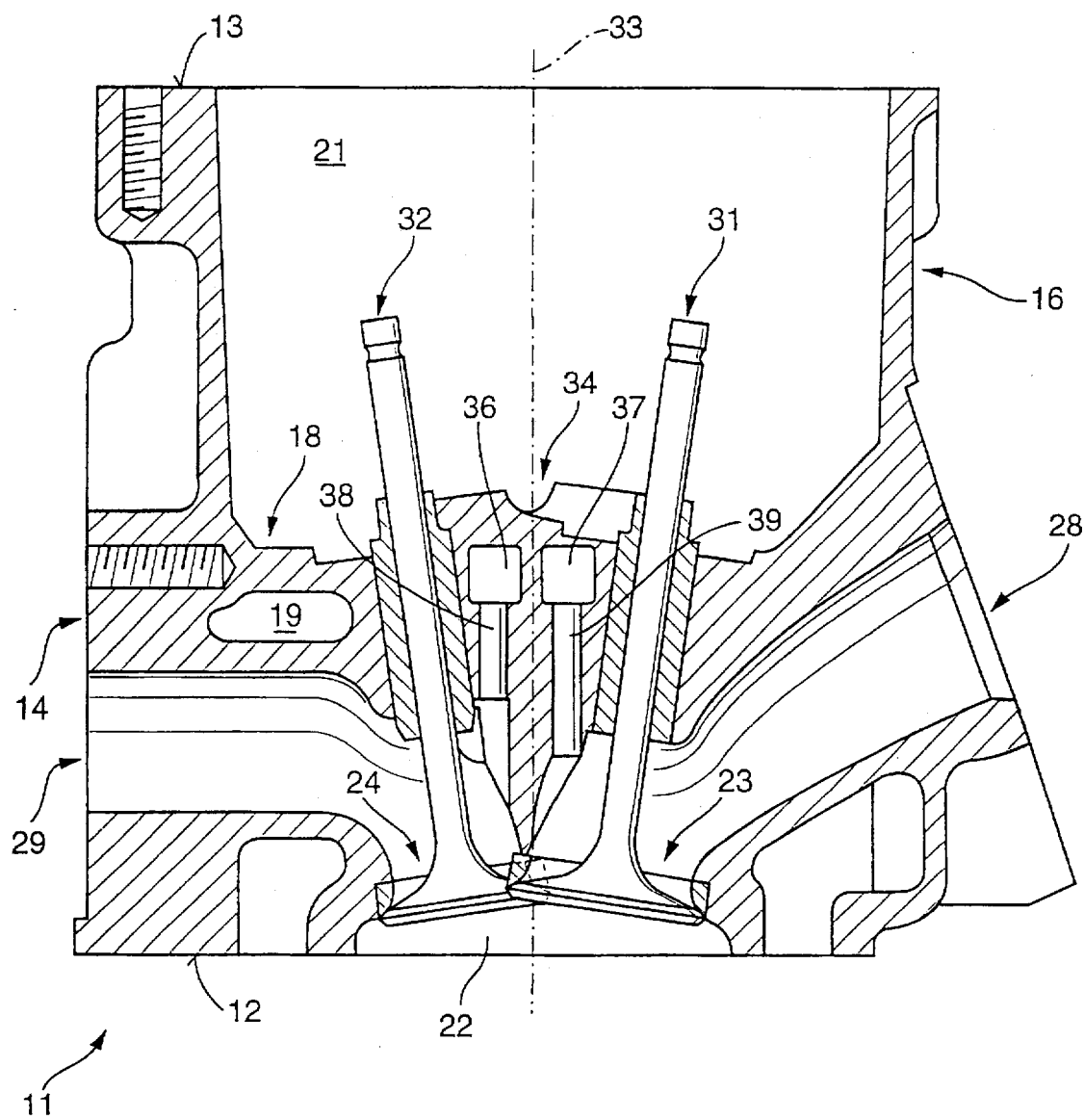
FIG. 1 is a schematic cross-sectional view of a cylinder head.

FIG. 1 shows a cylinder head for a liquid-cooled multi-cylinder internal combustion engine, the cylinder head consisting of a single casting. The cylinder head 11 has a cylinder head bottom 12 and sidewalls 14, 16 extending alongside the cylinder head 11 upwardly to a cylinder head cover plane 13 and between the front and rear end walls 17.

The cylinder head 11 includes integrally cast therewith a cylinder head top 18 which is disposed between, and spaced from, the cylinder head bottom 12 and the cylinder head cover plane 13 and which separates a coolant space 19 from a valve control space 21 above.

The cylinder head bottom 12 includes for each cylinder a recess forming a combustion chamber section 22 which has at least one inlet opening 23 with an inlet valve 31 and an outlet opening 24 with an outlet valve 32 and another opening leading to the combustion chamber for the reception of a spark plug or an injection nozzle (not shown). From the inlet and outlet openings 23, 24 inlet and outlet passages 28 and 29 extend up to the outer side walls 14 and 16. The inlet and outlet valves 31, 32 are controlled in a well known manner.

Between the inlet valve 31 and the outlet valve 32, an integrated channel system 34 is provided in the cylinder head 11 adjacent the longitudinal center plane 33 of the cylinder head 11. The integrated channel system 34 comprises two channels 36, 37 extending in the longitudinal direction of the engine through the cylinder head 11 with connecting branches 38, 39 leading to the outlet and inlet passages 29 and 28. The connecting branches 38, 39 are essentially bores which extend normal to the longitudinal channels 36 and 37 and which join the outlet and inlet passages 28 and 29 closely adjacent the outlet and inlet openings 24, 23 of the outlet and inlet passages 29 and 28.

The longitudinal channel 36 shown in FIG. 1 on the left side of the longitudinal center plane 33 is a secondary air supply channel and the longitudinal channel 37 shown on the right side of the longitudinal center plane 33 is an exhaust gas recirculation channel. The longitudinal channels 36, 37 are shown to have a square cross-section but they may have a different geometrical shape. They have to have however a minimum cross-section independently of their shape such that sufficient secondary air can be supplied to the exhaust passages and sufficient exhaust gas can be supplied to the inlet of each cylinder of the engine.

It is advantageous that the connecting branches 38, 39 join the inlet and outlet passages closely adjacent the inlet and outlet openings 23, 24 of the cylinders since this results in a turbulent mixing of the secondary air with the exhaust gas and of the exhaust gas with the air flowing into the cylinder so that relatively small volume flow changes provide for a rapid change of the gas mixture. It is also possible to provide two or more connecting branch bores 38, 39 for each inlet and outlet passage 28, 29.

Figure 2:
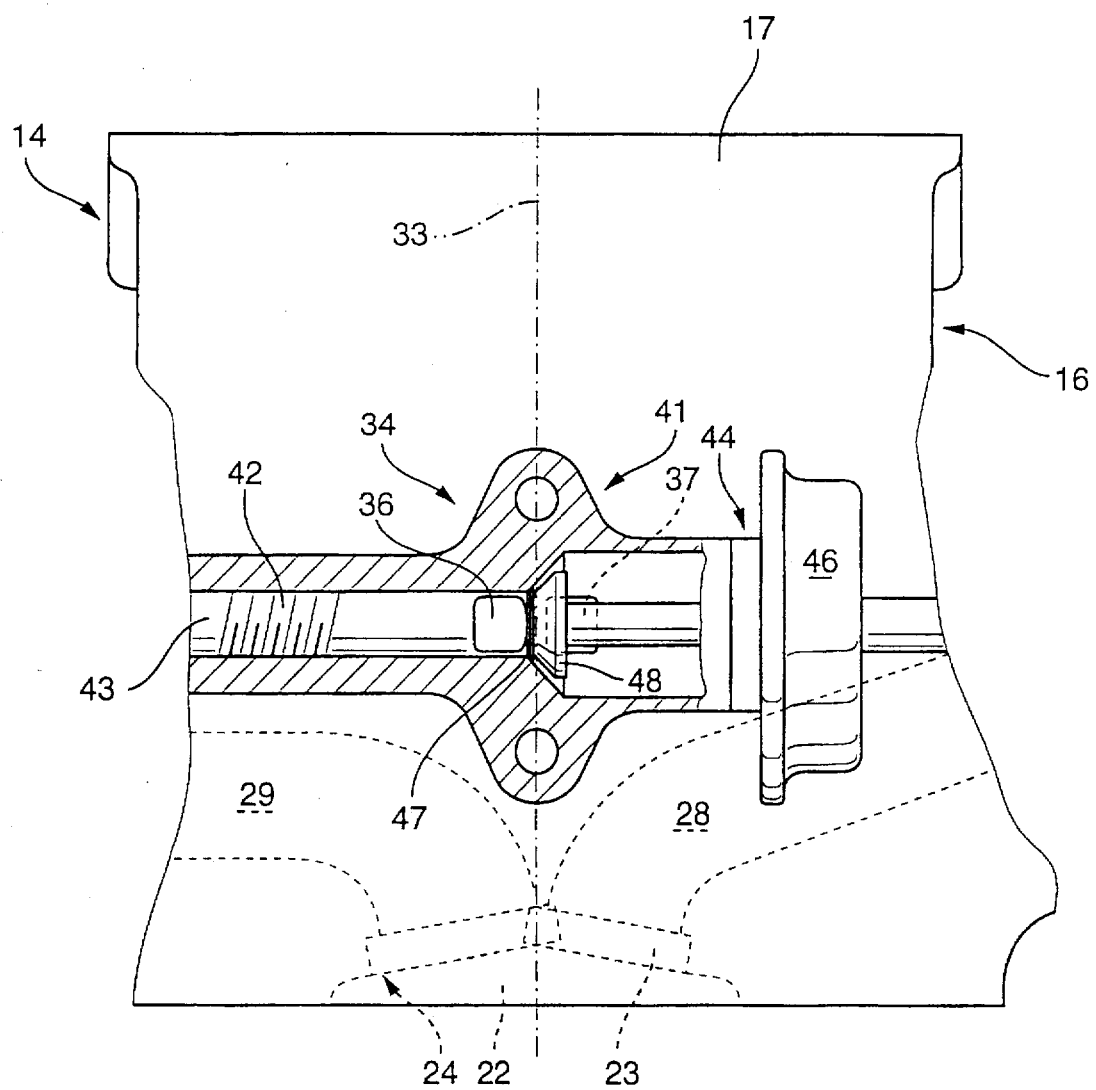
FIG. 2 is a schematic view of a cylinder with an exhaust gas recirculation valve attached to a flange structure mounted on the cylinder head and shown partially in cross-section to show the flow passages and connections.

FIG. 2 is a schematic view of the end wall 17 of the cylinder head 11 showing schematically in a partial cross-section a flange structure 41 arranged on the end wall 17. The flange structure 41 is preferably at the end wall of the cylinder head adjacent the transmission. It may be cast integrally with the cylinder head or it may be removably mounted thereon. The flange structure 41 has a connection 42 for a supply pipe 43 for supplying secondary air. Opposite this connection 42, there is another connection 44 for mounting an exhaust gas recirculation valve 46. The flange structure 41 includes a bore 47 extending between the longitudinal channel 36 and the longitudinal channel 37 which bore 47 is closed by a valve member 48 operated by the exhaust gas recirculation valve member 48. The bore 47 has a cross-section corresponding essentially to the cross-section of the connection 42 for the secondary air so that the shape of the flange structure is quite simple. The exhaust gas recirculation valve can be operated electrically or pneumatically for placing the two longitudinal channels 36, 37 in communication with one another to thereby activate either the secondary air supply or the exhaust gas recirculation.

The cylinder head 11 with the integrated channel system 34 and the flange structure 41 disposed on an end wall 17 preferably consist of a single casting. The longitudinal channels 36, 37 are obtained by casting with a separate core or with a channel core unit. Alternatively, the longitudinal channels 36, 37 may be formed by drilling.

With the integrated channel system 34, it is simple to provide for communication between the secondary air and the exhaust gas recirculation channels. For example, during engine warm-up, it is advantageous to admix secondary air to the exhaust gases as this improves the exhaust gas quality. Under this operating condition, the exhaust gas recirculation valve 46 is closed and the secondary air provided by an air pump (not shown) is supplied to the longitudinal channel 36 and by way of the connecting branches 38 to the outlet passages 29.

When the engine has reached a certain operating temperature which is sensed by sensors at various locations of the engine and this has been recognized by the engine control unit, the air pump for the secondary air supply is shut down. As a result, exhaust gas will enter the longitudinal channel 36 and, during partial load operation of the engine when the exhaust gas recirculation valve is opened to a degree corresponding to the gas pedal position, exhaust gas from the outlet passage 29 flows via the connecting branch 38 into the longitudinal channel 36 and through the bore 47 of the flange structure 41 into the other longitudinal channel 37 of the integrated channel system. Through the channel system 37, the exhaust gas can, by way of the connecting branches 39 be sucked into the inlet passages 28. Because of the short distances the exhaust gas has to travel within the integrated channel system 34, the exhaust gas can be recirculated to the inlet passages 28 without substantial temperature losses whereby the efficiency and the oxidation processes during combustion within the combustion chambers 22 of the cylinders are improved.

Alternatively, a check valve may be disposed in the connection 42 of the flange structure 41 such that the secondary air supply can be activated if the exhaust gas recirculation valve 46 is closed. As soon as the exhaust gas recirculation valve opens the bore 47 at least to some degree the exhaust gas is conducted from the outlet passages 29 by way of the longitudinal channel 36 into the longitudinal channel 37 and to the inlet passage 28.

What is claimed is:

1. A cylinder head for a liquid cooled multi-cylinder internal combustion engine, comprising: a casing with a coolant space, at least one inlet passage and at least one outlet passage for each cylinder extending through said coolant space, an inlet valve and an outlet valve mounted in said cylinder for closing and opening said inlet and outlet passages respectively, and an integrated channel system extending through said cylinder head and comprising at least a first channel with connecting branches to said outlet passages and a second channel with connecting branches to said inlet passages, said first and second channels are longitudinal channels extending over the length of said engine.

2. A cylinder head according to claim 1, wherein said first and second channels extend essentially parallel to one another and close to a center plane of said cylinder head.

3. A cylinder head according to claim 1, wherein said channels extend between the inlet and outlet valves of said inlet and outlet passages within a top portion of said cylinder head.

4. A cylinder head according to claim 1, wherein said connecting branches of said integrated channel system open into said inlet and outlet passages in close proximity to the inlet and outlet valves therein.

5. A cylinder head according to claim 1, wherein said integrated channel system is integrally cast with said cylinder head.

6. A cylinder head according to claim 1, wherein said longitudinal channels are open at the end wall of the engine adjacent a transmission mounted to the engine.

7. A cylinder head according to claim 6, wherein said first and second channels can be placed in communication via a flange structure.

8. A cylinder head according to claim 7, wherein said flange structure includes a connection for an exhaust gas recirculation valve and a connection for a secondary air supply line.

9. A cylinder head according to claim 8, wherein a bore in said flange structure provides for communication between said first and second channels and said exhaust gas recirculation valve includes a valve member which is disposed so as to open or close said bore.

* * * * *